United States Patent
Zhao et al.

(10) Patent No.: US 12,554,880 B2
(45) Date of Patent: Feb. 17, 2026

(54) SERVER, AND DATA PROCESSING METHOD EXECUTED BY SERVER

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Hongbo Feng, Beijing (CN); Jing Su, Beijing (CN); Shaobei Chen, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 133 days.

(21) Appl. No.: 18/565,150

(22) PCT Filed: May 26, 2022

(86) PCT No.: PCT/CN2022/095103
§ 371 (c)(1),
(2) Date: Nov. 29, 2023

(87) PCT Pub. No.: WO2022/253085
PCT Pub. Date: Dec. 8, 2022

(65) Prior Publication Data
US 2024/0265132 A1    Aug. 8, 2024

(30) Foreign Application Priority Data
May 31, 2021 (CN) .......................... 202110611071.5

(51) Int. Cl.
G06F 21/62    (2013.01)
(52) U.S. Cl.
CPC .............................. G06F 21/6245 (2013.01)

(58) Field of Classification Search
CPC ...... G06F 21/60; G06F 21/62; G06F 21/6218; G06F 21/6245
See application file for complete search history.

(56) References Cited

U.S. PATENT DOCUMENTS 10,423,845 B2    9/2019 Miller et al.
11,528,275 B2    12/2022 Tanriover et al.
(Continued)

FOREIGN PATENT DOCUMENTS

| CN | 104159083 A | 11/2014 |
| CN | 104966266 A | 10/2015 |

(Continued)

OTHER PUBLICATIONS

The Cyberspace Administration of China is open for Comments! 38 types of apps are prohibited from collecting users' personal information beyond the scope; Dec. 1, 2020 (Dec. 1, 2020) pp. 1-8 Retrieved from the website: [http://baijiahao.baidu.com/s?id=1684882718379941528&wfr=spider&for=pc].

(Continued)

*Primary Examiner* — D'Arcy Winston Straub
(74) *Attorney, Agent, or Firm* — Dilworth & Barrese, LLP.; Michael J. Musella, Esq.

(57) ABSTRACT

The present disclosure provides a server and a data processing method executed by a server. The data processing method executed by a server includes: determining whether data output by a device exceeds data required by an application, wherein the device and the application are registered to the server; and configuring the server or the device in a case where the data output by the device exceeds the data required by the application.

16 Claims, 4 Drawing Sheets

(56) References Cited

U.S. PATENT DOCUMENTS

| | | | |
|---|---|---|---|
| 11,631,407 B2 | 4/2023 | Gordon et al. | |
| 2010/0125603 A1* | 5/2010 | Lehikoinen | G06F 21/62 |
| | | | 707/E17.031 |
| 2016/0198002 A1 | 7/2016 | Penilla et al. | |
| 2018/0068192 A1* | 3/2018 | Miller | G06V 20/59 |
| 2018/0124080 A1 | 5/2018 | Christodorescu et al. | |
| 2019/0253671 A1 | 8/2019 | Miyanaka et al. | |
| 2019/0327238 A1* | 10/2019 | Chen | H04L 63/102 |
| 2021/0329165 A1* | 10/2021 | Liu | H04R 1/34 |
| 2022/0027509 A1* | 1/2022 | Amico | H04W 12/02 |

FOREIGN PATENT DOCUMENTS

| | | | |
|---|---|---|---|
| CN | 107810506 A | 3/2018 | |
| CN | 110719553 A | 1/2020 | |
| CN | 110741323 A | 1/2020 | |
| CN | 110958397 A | 4/2020 | |
| CN | 111429330 A | 7/2020 | |
| CN | 111476139 A | 7/2020 | |
| CN | 112199661 A | 1/2021 | |
| CN | 112291517 A | 1/2021 | |
| CN | 112350974 A | 2/2021 | |
| CN | 112671870 A | 4/2021 | |

OTHER PUBLICATIONS

International Search Report and Written Opinion from PCT Application No. PCT/CN2022/095103; Mailing Date: Aug. 30, 2022.

* cited by examiner

SERVER, AND DATA PROCESSING METHOD EXECUTED BY SERVER

CROSS-REFERENCE TO RELATED APPLICATION

This application is a U.S. National Phase Entry of International Application No. PCT/CN2022/095103 filed on May 26, 2022. The present application claims priority to and the benefit of the above-identified applications and the above-identified applications are incorporated by reference herein in their entirety.

TECHNICAL FIELD

The present disclosure relates to a field of data processing, and more particularly, to a server and a data processing method executed by a server.

BACKGROUND

An Internet of Things platform (server) is similar to a middleware, which connects devices (such as cameras, speakers, etc.) downwards and acquires device data, and connects applications (such as applications related to intelligent transportation and applications related to smart home, etc.) upwards and provides services for the applications. The applications can be strongly associated with the devices, for example, a device can be strongly associated with an application of a device manufacturer. In this case, the applications can perform device management, content management, etc. on the devices through the Internet of Things platform (server). In addition, the applications can also be weakly associated with the devices, for example, a device can also be weakly associated with a third-party application. In this case, the third-party application cannot manage the device, but can acquire the content provided by the device and develop an application based on the content acquired from the device.

However, regardless of whether a device is strongly or weakly associated with an application, the data of the device will be stored centrally in an Internet of Things platform (server), and some of the stored data may involve user privacy, but the data involved in user privacy may not be the data that the application needs to acquire, that is, the data acquired by the application may exceed the data required by the application.

With the enhancement of users' awareness of data protection, users hope to protect their private data and minimize the risk of leaking their private data.

SUMMARY

In view of the above problems, the present disclosure provides a data processing method executed by a server, which can effectively determine whether the data output by the device exceeds the data required by the application, and configure the server or the device based on a determination result, such that the application only acquires data required by its own functions, thereby reducing the risk of privacy data leakage and improving the user experience while ensuring the normal operation of the application functions.

The present disclosure provides a data processing method executed by a server, which includes determining whether data output by a device exceeds data required by an application, in which the device and the application are registered to the server; and configuring the server or the device in a case where the data output by the device exceeds the data required by the application.

According to at least one embodiment of the present disclosure, configuring the server or the device includes: if the device is configurable, configuring the device so that the device does not send data that exceeds the data required by the application to the server, or configuring the server so that the server does not receive data that exceeds the data required by the application, or processing received data so that processed data does not exceed the data required by the application in a case where the server receives data that exceeds the data required by the application; and if the device is not configurable, configuring the server so that the server does not receive data that exceeds the data required by the application, or processing received data so that processed data does not exceed the data required by the application in a case where the server receives data that exceeds the data required by the application.

According to at least one embodiment of the present disclosure, before determining whether the data output by the device exceeds the data required by the application, the data processing method further includes: acquiring a piece of attribute information of the application, in which the attribute information of the application includes a piece of application input attribute information and/or an application input constraint condition; and acquiring a piece of attribute information of the device, in which the attribute information of the device includes a piece of device output attribute information and/or a device output constraint condition, in which determining whether the data output by the device exceeds the data required by the application includes: determining whether the data output by the device exceeds the data required by the application according to the attribute information of the application and the attribute information of the device.

According to at least one embodiment of the present disclosure, determining whether the data output by the device exceeds the data required by the application according to the attribute information of the application and the attribute information of the device includes: determining whether the data output by the device exceeds the data required by the application according to at least one selected from a group consisting of: whether a value range of the application input attribute information is less than a value range of the device output attribute information; whether a value range of the application input constraint condition is less than a value range of the device output constraint condition; and whether a value range merging the value range of the application input attribute information and the value range of the application input constraint condition is less than a value range merging the value range of the device output attribute information and the value range of the device output constraint condition.

According to at least one embodiment of the present disclosure, configuring the device so that the device does not send the data that exceeds the data required by the application to the server includes configuring the device by at least one selected from a group consisting of: configuring the device at least according to a value range of the application input attribute information; configuring the device at least according to a value range of the application input constraint condition; and configuring the device at least according to a value range merging the value range of the application input attribute information and the value range of the application input constraint condition.

According to at least one embodiment of the present disclosure, configuring the device at least according to the value range of the application input attribute information includes: configuring the device according to the value range of the application input attribute information, or according to the value range of the application input attribute information and a value range of the device output attribute information; configuring the device at least according to the value range of the application input constraint condition includes: configuring the device according to the value range of the application input constraint condition, or according to the value range of the application input constraint condition and a value range of the device output constraint condition; and configuring the device at least according to the value range merging the value range of the application input attribute information and the value range of the application input constraint condition includes: configuring the device according to the value range merging the value range of the application input attribute information and the value range of the application input constraint condition, or according to the value range merging the value range of the application input attribute information and the value range of the application input constraint condition and a value range merging the value range of the device output attribute information and the value range of the device output constraint condition.

According to at least one embodiment of the present disclosure, configuring the server so that the server does not receive the data that exceeds the data required by the application includes: setting a response output constraint condition in the attribute information of the application; and responding to a data reporting request of the device according to the response output constraint condition, in which in a case where the response constraint condition is not met, the server does not respond to the data reporting request of the device, or the server returns a response comprising response failure in response to the data reporting request of the device.

According to at least one embodiment of the present disclosure, setting the response output constraint condition in the attribute information of the application includes: setting the response output constraint condition according to the application input constraint condition.

According to at least one embodiment of the present disclosure, processing the received data so that the processed data does not exceed the data required by the application includes: extracting data meeting the data required by the application from the received data.

According to at least one embodiment of the present disclosure, the server is an Internet of Vehicles platform, the device is a data acquisition device of a vehicle, the application is an application related to intelligent transportation installed in the vehicle, and the data output by the device includes data related to the vehicle and/or a piece of environmental information around the vehicle.

According to at least one embodiment of the present disclosure, the data acquisition device includes an image acquisition device, the data related to the vehicle includes an image and/or a video of an interior of the vehicle shot by the image acquisition device, and the data required by the application includes an image and/or a video of a driver of the vehicle.

According to at least one embodiment of the present disclosure, configuring the device includes: adjusting a shooting angle and/or a shooting trigger condition of the image acquisition device.

According to at least one embodiment of the present disclosure, the server is an Internet of Things platform, the device is an Internet of Things device capable of acquiring data, the application is an application related to smart home, and the data output by the device includes at least one selected from a group consisting of: audio data, image data and video data.

The present disclosure further provides a server, including: a determination unit, configured to determine whether data output by a device exceeds data required by an application, in which the device and the application are registered to the server; and a configuration unit, configured to configure the server or the device in a case where that the data output by the device exceeds the data required by the application.

According to at least one embodiment of the present disclosure, configuring the server or the device includes: if the device is configurable, configuring the device so that the device does not send data that exceeds the data required by the application to the server, or configuring the server so that the server does not receive data that exceeds the data required by the application, or processing received data so that processed data does not exceed the data required by the application in a case where the server receives data that exceeds the data required by the application; and if the device is not configurable, configuring the server so that the server does not receive data that exceeds the data required by the application, or processing received data so that processed data does not exceed the data required by the application in a case where the server receives data that exceeds the data required by the application.

According to at least one embodiment of the present disclosure, the server further includes an acquisition unit configured to: acquire a piece of attribute information of the application, in which the attribute information of the application comprises a piece of application input attribute information and/or an application input constraint condition; and acquire a piece of attribute information of the device, in which the attribute information of the device includes a piece of device output attribute information and/or a device output constraint condition, in which determining whether the data output by the device exceeds the data required by the application includes: determining whether the data output by the device exceeds the data required by the application according to the attribute information of the application and the attribute information of the device.

According to at least one embodiment of the present disclosure, determining whether the data output by the device exceeds the data required by the application according to the attribute information of the application and the attribute information of the device includes: determining whether the data output by the device exceeds the data required by the application according to at least one selected from a group consisting of: whether a value range of the application input attribute information is less than a value range of the device output attribute information; whether a value range of the application input constraint condition is less than a value range of the device output constraint condition; and whether a value range merging the value range of the application input attribute information and the value range of the application input constraint condition is less than a value range merging the value range of the device output attribute information and the value range of the device output constraint condition.

According to at least one embodiment of the present disclosure, configuring the device so that the device does not send the data that exceeds the data required by the application to the server includes configuring the device by at least one selected from a group consisting of: configuring the device at least according to a value range of the application input attribute information; configuring the device at least according to a value range of the application input constraint condition; and configuring the device at least according to a value range merging the value range of the application input attribute information and the value range of the application input constraint condition.

According to at least one embodiment of the present disclosure, configuring the device at least according to the value range of the application input attribute information includes: configuring the device according to the value range of the application input attribute information, or according to the value range of the application input attribute information and a value range of the device output attribute information; configuring the device at least according to the value range of the application input constraint condition includes: configuring the device according to the value range of the application input constraint condition, or according to the value range of the application input constraint condition and a value range of the device output constraint condition; and configuring the device at least according to the value range merging the value range of the application input attribute information and the value range of the application input constraint condition includes: configuring the device according to the value range merging the value range of the application input attribute information and the value range of the application input constraint condition, or according to the value range merging the value range of the application input attribute information and the value range of the application input constraint condition and a value range merging the value range of the device output attribute information and the value range of the device output constraint condition.

According to at least one embodiment of the present disclosure, configuring the server so that the server does not receive the data that exceeds the data required by the application includes: setting a response output constraint condition in the attribute information of the application; and responding to a data reporting request of the device according to the response output constraint condition, in which in a case where the response constraint condition is not met, the server does not respond to the data reporting request of the device, or the server returns a response including response failure in response to the data reporting request of the device.

According to at least one embodiment of the present disclosure, setting the response output constraint condition in the attribute information of the application includes: setting the response output constraint condition according to the application input constraint condition.

According to at least one embodiment of the present disclosure, processing the received data so that the processed data does not exceed the data required by the application includes: extracting data meeting the data required by the application from the received data.

According to at least one embodiment of the present disclosure, the server is an Internet of Vehicles platform, the device is a data acquisition device of a vehicle, the application is an application related to intelligent transportation installed in the vehicle, and the data output by the device includes data related to the vehicle and/or a piece of environmental information around the vehicle.

According to at least one embodiment of the present disclosure, the data acquisition device includes an image acquisition device, the data related to the vehicle includes an image and/or a video of an interior of the vehicle shot by the image acquisition device, and the data required by the application includes an image and/or a video of a driver of the vehicle.

According to at least one embodiment of the present disclosure, configuring the device includes: adjusting a shooting angle and/or a shooting trigger condition of the image acquisition device.

According to at least one embodiment of the present disclosure, the server is an Internet of Things platform, the device is an Internet of Things device capable of acquiring data, the application is an application related to smart home, and the data output by the device includes at least one selected from a group consisting of: audio data, image data and video data.

The present disclosure further provides a server, including a processor and a memory, in which the memory stores computer-executable instructions, and the computer-executable instructions, when executed by the processor, cause the processor to perform the above-mentioned data processing method executed by the server.

The present disclosure further provides a computer-readable recording medium storing computer-executable instructions, in which the computer-executable instructions, when executed by a processor, cause the processor to perform the above-mentioned data processing method executed by the server.

The present disclosure provides a server and a data processing method executed by a server. The data processing method can effectively determine whether the data output by the device exceeds the data required by the application, and configure the server or the device based on a determination result, such that the application only acquires data required by its own functions, thereby reducing the risk of privacy data leakage and improving the user experience while ensuring the normal operation of the application functions.

BRIEF DESCRIPTION OF THE DRAWINGS

In order to more clearly illustrate the technical solutions of the embodiments of the present disclosure, the drawings that need to be used in description of the embodiments will be briefly described in the following. Apparently, the drawings in the following description are only some embodiments of the present disclosure. For those skilled in the art, other drawings can also be obtained based on these drawings without any inventive work.

DETAILED DESCRIPTION

Figure 1:
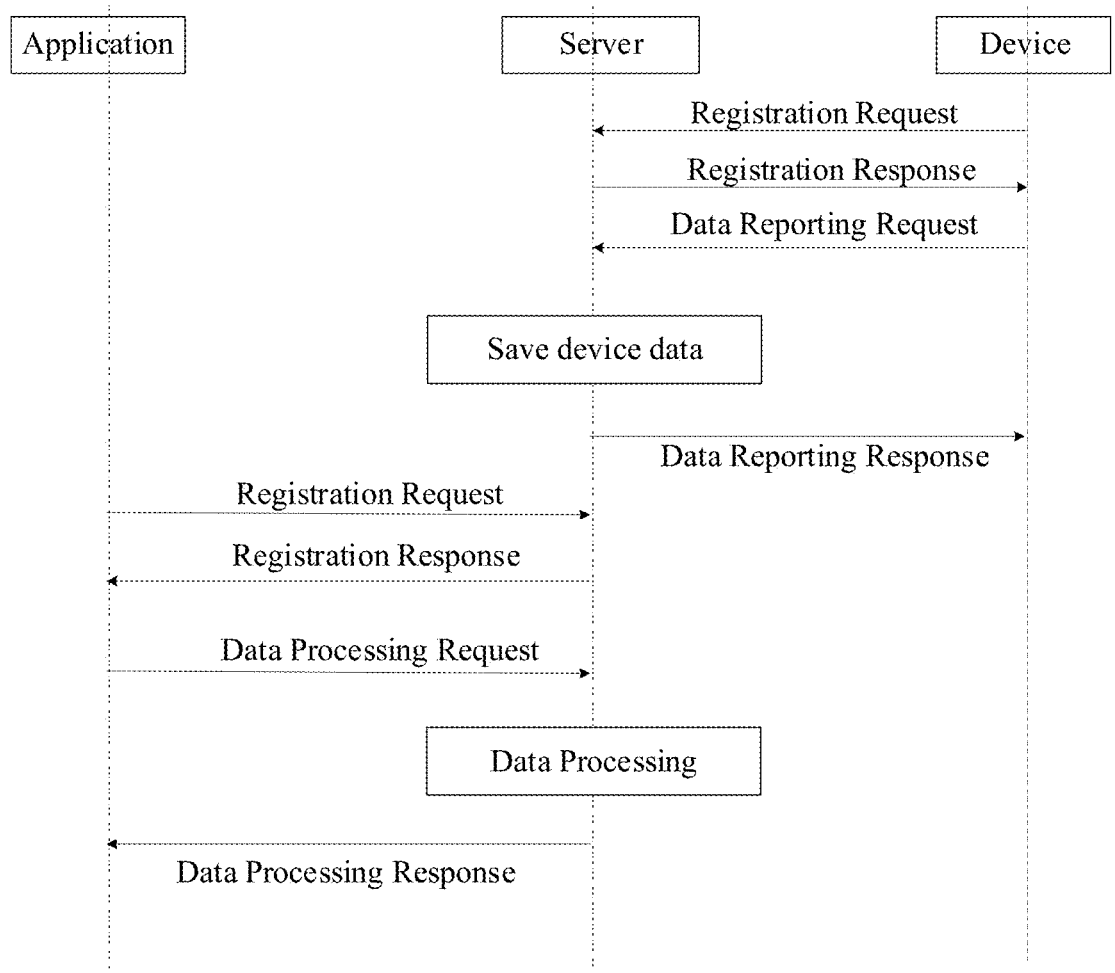
FIG. 1 illustrates a flowchart of registration and data reporting.

In order to make the purposes, technical solutions and advantages of the present disclosure more obvious, exemplary embodiments according to the present disclosure will be described in detail below with reference to the drawings. Apparently, the described embodiments are only a part but not all of the embodiments of this disclosure, and it can be understood that the present disclosure is not limited by the example embodiments described here.

In the present specification and drawings, basically the same or similar steps and elements are denoted by the same or similar reference numerals, and repeated descriptions of these steps and elements will be omitted. Meanwhile, in the description of the present disclosure, the terms "first", "second", etc. are only used to distinguish descriptions, and cannot be understood as indicating or implying relative importance or ranking.

In the present specification and drawings, according to the embodiments, the elements are described in singular or plural form. However, the singular and plural forms are appropriately selected for the presented situation only for convenience of explanation and are not intended to limit the present disclosure. Therefore, the singular form can include the plural form, and the plural form can also include the singular form unless the context clearly indicates otherwise.

With the continuous development of Internet of Things technology, communication technology, etc., the processing capabilities of Internet of Things devices (such as cameras, speakers, air purifiers, etc.) continue to increase. Data generated by the Internet of Things devices are sent to an Internet of Things platform (server) through wireless network, and the Internet of Things platform (server) achieves centralized management of Internet of Things devices and data. Various applications (such as applications related to intelligent transportation, applications related to smart home, etc.) are connected to the Internet of Things platform (server) and analyze the data of the Internet of Things devices. As the middle layer, the Internet of Things platform (server) provides a unified interface for the applications, and the applications achieve operations such as device management and data acquisition through the Internet of Things platform (server).

The data of Internet of Things devices are sent to the Internet of Things platform (server) in the following two ways. One way is: the device actively reports, that is, the device sends data to the Internet of Things platform (server) through a data reporting request, for example, the device periodically reports the location information of the device, as illustrated in FIG. 1; another way is: server subscription, that is, in the case where the state of the device meets a subscription condition, the device sends data, such as infrared sensing human event data, to the server. Further, in order to ensure the privacy of device data, the server can set the access control authority of the data and provide different access control authority for different applications, and only applications with corresponding authority can access the device data.

In addition, because the growth rate of the amount of data transmitted by the devices to the Internet of Things platform (server) far exceeds the growth rate of network, and considering the privacy of users, edge computing has emerged as the times require. The edge server is responsible for real-time acquisition of the device data, real-time calculation and command distribution. For example, the on-board processor of intelligent vehicle has high computing power (for example, Huawei Kirin 990A chip has 3.5 Tera Operations Per Second (TOPS) computing power), but because the processing capability of the edge server is still limited, it is impossible to build and update algorithm model in real time, and the edge server still needs to send the data to the cloud server for processing, perform model training in the cloud server, and then send a built model to the edge server. In the above process, the data generated by the Internet of Things devices still need to be sent to the cloud server (that is, the Internet of Things platform (server)). When the cloud server leaks information, users still face the risk of information leakage.

In addition, taking smart home as an example, a smart speaker and other devices have the functions of voice analysis, content service, etc., but in order to improve the accuracy of voice recognition, the smart speaker will acquire the usual conversation content of users and train the model. The content of these usual conversations may involve the user's privacy, which in turn may leak the user's privacy.

Taking an intelligent vehicle as an example, the intelligent vehicle integrates a variety of devices (such as sensors, cameras, etc.), which are configured to acquire information inside and/or outside the vehicle, such as surrounding vehicle information, traffic light information, and driver information inside the vehicle. Applications (such as applications related to intelligent transportation) provide services such as safety and unmanned driving, etc. by intelligently analyzing the data of the vehicle networking platform (server). For example, a vehicle safety driving application determines whether the driver is fatigued or not by acquiring the image of the driver in the vehicle. However, the data acquired by the Internet of Things devices in the vehicle currently exceeds data required by the application itself. For example, two shots of Tesla's in-car camera have been released abroad recently, in which not only the driver, the co-driver, the rear passengers, etc. can be seen, but also the faces of the people in the car can be clearly seen.

To sum up, in the above-mentioned technology, there is a problem that the data acquired by the application may exceed the data required by the application, and this problem may lead to the leakage of user privacy.

In view of the above problem, the present disclosure provides a server and a data processing method executed by the server. Because the method can determine whether the data output by the device exceeds the data required by the application, and configure the server or the device based on a determination result, such that the application only acquires the data required by its own functions. This not only ensures the normal operation of the application functions, but also reduces the risk of user privacy data being leaked and improves the user experience.

The data processing method executed by the server provided by the present disclosure will be described in detail below with reference to the drawings.

Figure 2:
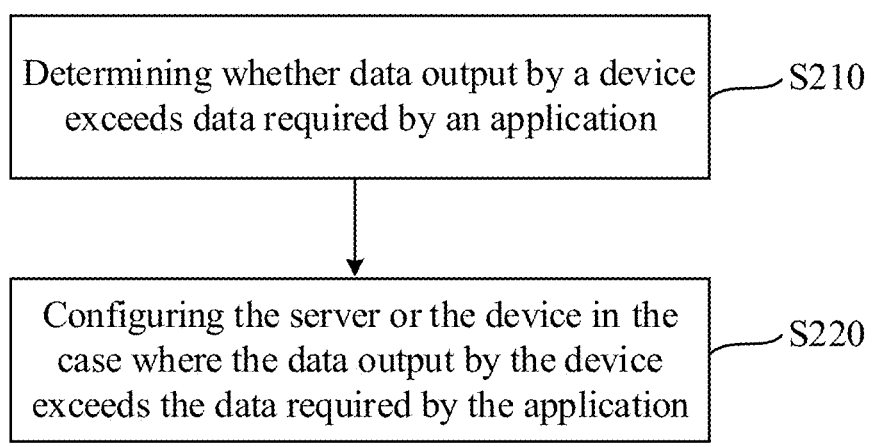
FIG. 2 illustrates a flowchart of a data processing method executed by a server according to at least an embodiment of the present disclosure.

FIG. 2 illustrates a flowchart of a data processing method executed by a server according to at least an embodiment of the present disclosure.

Referring to FIG. 2, in step S210, the server can determine whether the data output by the device exceeds the data required by the application.

As an example, the server is an Internet of Things platform, the device is an Internet of Things device capable of acquiring data, such as a camera, a speaker, etc., the application is an application related to smart home (such as an application for intelligently controlling home devices through voice recognition, an application for acquiring information of the elderly to determine whether the elderly fell and reminding the elderly, etc.), and the data output by the device includes at least one selected from a group consisting of: audio data, image data and video data, but not limited to this.

As another example, the server is an Internet of Vehicles platform, the device is a data acquisition device of a vehicle, the application is an application related to intelligent transportation installed in the vehicle (for example, a vehicle safety driving application, a network car-hailing application, etc., and the vehicle safety driving application or the network car-hailing application can determine whether the driver has behavior such as fatigue driving through image(s) and/or video(s) of the driver), and the data output by the device includes data related to the vehicle and/or environmental information around the vehicle. For example, the data acquisition device includes an image acquisition device, and the data related to the vehicle includes image(s) and/or video(s) of the interior of the vehicle shot by the image acquisition device. In addition, as an example, the data required by the application includes image(s) and/or video(s) of the driver of the vehicle, but not limited thereto.

Accord to an embodiment of the present disclosure, the device and the application can be registered to the server.

As an example, the device or the application is registered to the server for the first time or registered to the server again. The registration process of the device or the application may be similar to the registration process of existing standard Internet of Things device or application, and will not be described here.

According to an embodiment of the present disclosure, before the step S210, the server can acquire the attribute information of the application and the attribute information of the device.

As an example, the attribute information of the application includes a piece of application input attribute information and/or application input constraint condition. In addition, the attribute information of the application further includes a piece of function description attribute information and/or a piece of application output attribute information.

As an example, the attribute information of the device includes a piece of device output attribute information and/or a device output constraint condition. In addition, the attribute information of the device further includes a piece of device description attribute information and/or a piece of device output attribute information.

According to an embodiment of the present disclosure, the attribute information of the application or the attribute information of the device can be acquired in the following ways.

First, the server can define attribute information for the application or the device. Specifically, the application will provide the attribute information of the application to the server when the application is released, and the server can define the attribute information for the application according to the provided attribute information, or the server can generate the attribute information of the application according to the relevant information of the application. Similarly, the device will provide the attribute information of the device when the device registers with the server, or the server can acquire the attribute information of the device through an out-of-band mechanism; and the server can define the attribute information for the device according to the attribute information, or the server can generate the attribute information of the device according to the related information of the device, for example, the server can acquire the reporting information of the device, and then construct the attribute information of the device according to the reporting information of the device.

Second, the server can acquire the attribute information of the application. The attribute information of the application includes at least one selected from a group consisting of: the function description attribute information, the application input attribute information, the application output attribute information, and the application input constraint condition, and the application input constraint condition includes time, place, environment and other elements when the application acquires the input. Optionally, the server can verify the value range of the attribute information of the application through a verification tool. For example, the verification tool can verify whether the content output by the application meets the requirements of the value range of the application output attribute information by providing the content within the value range of the application input required in the attribute information of the application to the application, and if meets, the attribute information is correct. Optionally, the verification tool can also provide the content within the value range of the application input constraint condition to the application to verify whether the content output by the application meets the requirements of the value range of the application output attribute information, and if meets, the attribute information is correct. Optionally, the verification tool can also provide input content to the application beyond the value range of the application input constraint condition to verify whether the output meets the requirements of the value range of the application output attribute information, and if not meets, the attribute information is correct.

Finally, the server can acquire the attribute information of the device. The attribute information of the device may include at least one selected from a group consisting of: the device description attribute information, the device output attribute information and the device output constraint condition.

In addition, the above-mentioned order in which the server acquires the attribute information of the device and the attribute information of the application is only an example, and the server may acquire the attribute information of the device first and then the attribute information of the application, or the server may acquire the attribute information of the device and the attribute information of the application at the same time.

As an example, in the case that the server is a vehicle network platform, for example, the attribute information of the device and the attribute information of the application acquired by the server are illustrated in the following table 1, in which the value range of the application input attribute information is: driver image(s) and driver video(s); the value range of the application input constraint condition is: content=driver's head, time=during vehicle starts; the value range of the device output attribute information is: image(s) and video(s); and the value range of the device output constraint condition is fixed time interval.

TABLE 1

| The attribute information of the application | | | | The attribute information of the device | | |
|---|---|---|---|---|---|---|
| Function description | Application output | Application input | Application input constraint condition | Device description | Device output | Device output constraint condition |
| Configured to acquire the driver's head information during driving, and determine whether the driver is distracted and give a reminder. | Whether the driver's eyes are closed for a long time and whether the driver is looking ahead. | Driver image(s), Driver video(s) | Content = driver's head Time = during vehicle starts. | Camera | Image(s), Video(s) | Fixed time interval |

According to an embodiment of the present disclosure, the attribute information of the application or the attribute information of the device can also be acquired by user input.

As an example, when a user starts an application, the server starts an application configuration interface (such as a Graphical User Interface, GUI). In this configuration interface, the user can input the attribute information of the application and the corresponding value range of the attribute information of the application, or input the attribute information of the device and the corresponding value range of the attribute information of the device, in which the attribute information of the application includes at least one selected from a group consisting of: the function description attribute information, the application input attribute information, the application output attribute information, and the application input constraint condition, and the application input constraint condition includes factors such as time, place and environment when the application acquires input; and the attribute information of the device includes at least one selected from a group consisting of: the device description attribute information, the device output attribute information and the device output constraint condition.

After the user input is completed, the server can acquire the relevant attribute information of the application or device and the corresponding value range of the relevant attribute information of the application or device according to the information input by the user, and can also verify the attribute information of the application and the corresponding value range of the attribute information of the application through the above-mentioned verification method, which is not repeated here. Table 2 below illustrates the attribute information of the application or the device acquired by user input, in which the related information of two applications (for example, an intelligent transportation application and a smart home application) acquired according to user input is illustrated in Table 2.

TABLE 2

| The attribute information of the application | | | | The attribute information of the device | | |
|---|---|---|---|---|---|---|
| Function description | Application output | Application input | Application input constraint condition | Device description | Device output | Device output constraint condition |
| Configured to acquire the driver's head information during driving, and determine whether the driver is distracted and give a reminder. | Whether the driver's eyes are closed for a long time and whether the driver is looking ahead. | Driver image(s), Driver video(s) | Content = driver's head<br><br>Time = during vehicle starts | Camera | Image(s), Video(s) | None |
| Configured to acquire the information of the elderly, and determine whether the elderly fell and give a reminder. | Whether the elderly suddenly fell. | Image(s) and video(s) of the elderly | Content = the elderly | Camera | Image(s), video(s) | None |

According to an embodiment of the present disclosure, the attribute information of the application can also be acquired in the following way, which is more suitable for the case that the server has acquired the function description attribute information, the application input attribute information and the application output attribute information of the application and their value ranges, but lacks the value range of the application input constraint condition.

First, the server acquires the value range of the function description attribute information of the application. As illustrated in Table 3 below, the acquired value range of the function description attribute information of the application is: it is configured to acquire the driver's head information during driving, and determine whether the driver is distracted and give a reminder.

Second, the server uses technologies such as natural language processing, machine learning, etc. to the extract keyword(s) in the value range of the function description attribute information. For example, the extracted keywords are driver's head information, during driving, or the like.

Then, the extracted keywords are compared with the contents in the value range of the application output attribute information and the contents in the value range of the application input attribute information. As illustrated in Table 3 below, the contents in the value range of the application output attribute information are whether the driver's eyes are closes for a long time, whether the driver is looking ahead, or the like; and the contents in the value range of the application input attribute information are driver image(s) and driver video(s). the extracted keywords are compared with the contents in the above-mentioned two value ranges.

Finally, if the information is found to be missing after comparison, the missing content is added to the application input constraint condition. In addition, the attribute information of the application and the corresponding value range of the attribute information of the application can be verified by the above-mentioned verification method, which is not repeated here. As illustrated in the Table 3 below, the information of "driver's head" and "during driving" is found missing through the comparison, and the above missing information is added to the application input constraint condition, as illustrated in the Table 3 below.

the data required by the application includes determining whether the data output by the device exceeds the data required by the application according to the acquired attribute information of the application and the acquired attribute information of the device.

According to an embodiment of the present disclosure, it can be determined whether the data output by the device exceeds the data required by the application by determining whether the value range of the application input attribute information is less than the value range of the device output attribute information.

As an example, referring to Table 1 above, the value range of the application input attribute information is driver image(s) and driver video(s), and the value range of the device output attribute information is image(s) and video(s). By comparing the above two value ranges, it can be concluded that the value range of the application input attribute information is less than the value range of the device output attribute information, and then it can be determined that the data output by the device exceeds the data required by the application.

According to an embodiment of the present disclosure, it can be determined whether the data output by the device exceeds the data required by the application by determining whether the value range of the application input constraint condition is less than the value range of the device output constraint condition.

As an example, referring to Table 1 above, the value range of the application input constraint condition is as follows: content=driver's head, time=during vehicle starts; and the value range of the device output constraint condition is: fixed time interval (that is, time=fixed time interval). By comparing the above two value ranges, it can be concluded that the value range of the application input constraint condition is less than the value range of the device output constraint condition, and then it is determined that the data output by the device exceeds the data required by the application.

According to an embodiment of the present disclosure, it can be determined whether the data output by the device exceeds the data required by the application by determining

TABLE 3

| The attribute information of the application | | | | The attribute information of the device | | |
|---|---|---|---|---|---|---|
| Function description | Application output | Application input | Application input constraint condition | Device description | Device output | Device output constraint condition |
| Configured to acquire the driver's head information during driving, and determine whether the driver is distracted and give a reminder. | Whether the driver's eyes are closed for a long time and whether the driver is looking ahead. | Driver image(s), Driver video(s) | Content = driver's head Time = during vehicle starts | Camera | Image(s), Video(s) | None |

In addition, one or more of the above-mentioned methods for acquiring the attribute information of the application or the attribute information of the device can be flexibly selected based on the actual application scenario, and the details are not repeated here.

According to an embodiment of the present disclosure, determining whether the data output by the device exceeds whether the value range merging the value range of the application input attribute information and the value range of the application input constraint condition is less than the value range merging the value range of the device output attribute information and the value range of the device output constraint condition.

As an example, referring to Table 1 above, the value range of the application input attribute information is driver image(s) and driver video(s); the value range of the application input constraint condition is: content=driver's head, time=during vehicle starts; the value range of the device output attribute information is image(s) and video(s); and the value range of the device output constraint condition is: fixed time interval (that is, time=fixed time interval).

The value range merging the value range of the application input attribute information and the value range of the application input constraint condition is as follows: content=driver's head image and driver's head video, time=during vehicle starts.

The value range merging the value range of the device output attribute information and the value range of the device output constraint condition is as follows: content=image and video, time=fixed time interval.

By comparing the above-mentioned merged value ranges, it can be concluded that the value range merging the value range of the application input attribute information and the value range of the application input constraint condition is less than the value range merging the value range of the device output attribute information and the value range of the device output constraint condition, and then it is determined that the data output by the device exceeds the data required by the application.

In addition, one or more of the above-mentioned ways of determining whether the data output by the device exceeds the data required by the application can be flexibly selected based on the actual application scenario.

As an example, in the case that the application input attribute information and the device output attribute information are present, and the application input constraint condition and the device output constraint condition are absent, it can be selected to determine whether the data output by the device exceeds the data required by the application by determining whether the value range of the application input attribute information is less than the value range of the device output attribute information.

As another example, in the case that the application input attribute information and the device output attribute information are present, and the application input constraint condition and the device output constraint condition are also present, any one or more of the above-mentioned determination methods can be selected to determine whether the data output by the device exceeds the data required by the application. That is, determining whether the data output by the device exceeds the data required by the application is performed by selecting any one or more of: whether the value range of the application input attribute information is less than the value range of the device output attribute information, whether the value range of the application input constraint condition is less than the value range of the device output constraint condition, and whether the value range merging the value range of the application input attribute information and the value range of the application input constraint condition is less than the value range merging the value range of the device output attribute information and the value range of the device output constraint condition.

In addition, for the case that multiple applications correspond to the same device, the determination can be made separately for each application, as long as the result of determining one application is that the data output by the device exceeds the data required by the application, it can finally conclude that the data output by the device exceeds the data required by the application. The specific method of determining whether the data output by the device exceeds the data required by the application can refer to the above-mentioned description and will not be repeated here.

Referring to FIG. 2 again, in step S220, in the case where the data output by the device exceeds the data required by the application, the server or the device can be configured.

According to an embodiment of the present disclosure, configuring the server or the device includes: if the device is configurable, configuring the device so that the device does not send data that exceeds the data required by the application to the server, or configuring the server so that the server does not receive data that exceeds the data required by the application, or processing received data so that processed data does not exceed the data required by the application in the case where the server receives data that exceeds the data required by the application.

According to an embodiment of the present disclosure, configuring the server or the device further includes: if the device is not configurable, configuring the server so that the server does not receive data that exceeds the data required by the application, or processing received data so that processed data does not exceed the data required by the application in the case where the server receives data that exceeds the data required by the application.

According to an embodiment of the present disclosure, configuring the device so that the device does not send the data that exceeds the data required by the application to the server includes configuring the device at least according to the value range of the application input attribute information.

According to an embodiment of the present disclosure, configuring the device at least according to the value range of the application input attribute information includes: configuring the device according to the value range of the application input attribute information, or according to the value range of the application input attribute information and the value range of the device output attribute information.

As an example, as illustrated in Table 1 above, it has been determined that the data output by the device exceeds the data required by the application according to the above-mentioned determination method. In this case, the device can be configured according to the value range of the application input attribute information (driver image(s), driver video(s), etc.), or according to the value range of the application input attribute information and the value range of the device output attribute information (image(s), video(s), etc.). For example, in the case where the device is a data acquisition device of a vehicle and the data acquisition device includes an image acquisition device, configuring the device includes, but is not limited to, adjusting the shooting angle and/or the shooting trigger condition of the image acquisition device. Specifically, the configuration information of the device can be generated according to the above-mentioned value range, and the mapping relationship between the above-mentioned value range and the configuration information of the device can be established and maintained by the server. Optionally, the server can try many times by the method of "configuration+verification" until the output content of the device meets the value range of the application input attribute information. The specific generation rule and the mapping relationship mentioned above can be flexibly set according to actual application scenarios.

According to an embodiment of the present disclosure, configuring the device so that the device does not send the data that exceeds the data required by the application to the server includes configuring the device at least according to the value range of the application input constraint condition.

According to an embodiment of the present disclosure, configuring the device at least according to the value range of the application input constraint condition includes: configuring the device according to the value range of the application input constraint condition, or according to the value range of the application input constraint condition and the value range of the device output constraint condition.

As an example, in the case where a single application or multiple applications have the same or similar data requirement (that is, the value range(s) of the application input attribute information of a single application or multiple applications is(are) the same or similar), the server can generate the device output constraint condition, and then configure the device.

Specifically, the server can change the configuration of the device so that the data of the device meets the generated device output constraint condition. In the case where the data provided by the device is greater than the data required by the application, the configuration of the device is modified to reduce the output data range of the device and meet the data required by the application.

Specifically, the configuration information of the device can be based on the value range of the application input constraint condition and/or the value range of the device output constraint condition. As an example, as illustrated in Table 4 below, the Table 4 illustrates three cases and what constraint conditions are used to generate the configuration information of the device for each case.

TABLE 4

| Method | Application input constraint condition | Device output constraint condition | Configuration information of the device |
|---|---|---|---|
| 1 | present | absent | According to the application input constraint condition. |
| 2 | absent | present | According to the device output constraint condition |

TABLE 4-continued

| Method | Application input constraint condition | Device output constraint condition | Configuration information of the device |
|---|---|---|---|
| 3 | present | present | According to the difference between the application input constraint condition and the device output constraint condition |

Taking intelligent driving as an example, the configuration information of the device is generated according to the application input constraint condition. The mapping relationship between the application input constraint condition and the device configuration information is established and maintained by the server. Optionally, the server can try many times by the method of "configuration+verification" until the output content of the device meets the value range of the application input attribute information.

The mapping relationship between the input constraint condition and the configuration information of the device is illustrated in the following Table 5:

TABLE 5

| Constraint condition | Camera type device | Location type device |
|---|---|---|
| Content is not empty. | Adjust the angle of the device, for example, the angle adjustment amplitude = 10 degrees; adjust the recognition target, target = constraint condition. | Adjust the location range, for example, the location adjustment amplitude = 100 m. |
| Time is not empty. | Adjust the reporting time, such as time ≠ t1; or adjust the reporting period, for example, time interval = t2. | Adjust the reporting time, such as time ≠ t1; or adjust the reporting period, for example, time interval = t2. |

Specific examples are illustrated in the following Table 6:

TABLE 6

| | Attribute information of the application | | | | Attribute information of the device | | |
|---|---|---|---|---|---|---|---|
| Function description | Application output | Application input | Application input constraint condition | Device description | Device output | Configuration information of the device |
| Configured to acquire the driver's head information during driving, and determine whether the driver is distracted and give a reminder. | Whether the driver's eyes are closed for a long time and whether the driver is looking ahead. | Driver image(s), Driver video(s) | Content = driver's head Time = during vehicle starts | Camera | Image(s), Video(s) | Vertical angle of device = 90 Horizontal angle of device = 90 Capturing condition = during vehicle starts |
| Configured to acquire the information of the elderly, and determine whether the elderly fell and give a reminder. | Whether the elderly suddenly fell? | Image(s) and video(s) of the elderly | Content = the elderly | Camera | Image(s), video(s) | Target recognition start Target = the elderly |

As another example, in the case where multiple applications have different requirements for data, the server can generate multiple device output constraint conditions.

Specifically, as illustrated in Table 7 below, two applications related to intelligent transportation and two applications related to smart home are illustrated in Table 7.

For two applications related to smart home, it can be finally determined that the data output by the device exceeds the data required by the application through the above-mentioned determination method. In addition, as can be seen from Table 7 above, the two applications have different value ranges for the application input attribute information

TABLE 7

| | Attribute information of the application | | | | Attribute information of the device | | Device Output constraint |
|---|---|---|---|---|---|---|---|
| | Function description | Application output | Application input | Apply input constraint condition | Device description | Device output | condition (set by the server) |
| Application related to intelligent transportation | Configured to acquire the driver's head information during driving, and determine whether the driver is distracted and give a reminder. | Whether the driver's eyes are closed for a long time and whether the driver is looking ahead. | Driver image(s), Driver video(s) | Content = driver's head Time = during vehicle starts | Camera | Image(s), Video(s) | None |
| | Safety start of vehicle | Whether the driver is a legitimate user. | Driver image(s), Driver video(s) | Content = driver's head Time = when vehicle starts | Camera | Image(s), Video(s) | Send when vehicle starts |
| Application related to smart home | Configured to acquire the information of the elderly, and determine whether the elderly fell and give a reminder. | Whether the elderly suddenly fell. | Image(s) and video(s) of the elderly | Content = the elderly | Camera | Image(s), video(s) | None |
| | Clothing recommendation | Clothing collocation index | Image(s), video(s) | | Camera | Image(s), video(s) | Triggered by user voice |

As illustrated in Table 7 above, for two applications related to intelligent transportation, it can be finally determined that the data output by the device exceeds the data required by the application through the above-mentioned determination method. In addition, as can be seen from Table 7 above, the value ranges of the application input attribute information of the two applications are the same, and the value ranges of the device output attribute information of the devices are the same. In this case, it is necessary to further compare the value ranges of multiple application input constraint conditions with the value ranges of the device output constraint conditions, and it is found that the value ranges of the multiple application input constraint conditions do not overlap, so it is necessary to configure the device output constraint condition in a time-sharing manner, and the configurations are different at different times.

and different value ranges for the constraint conditions. Therefore, the output constraint condition of the device can be configured, so that the device can acquire different data for different applications, for example, adding "triggered by user voice" configuration for the clothing recommendation application, so that the platform can know that the data that should be acquired at present can meet the data requirements of the clothing recommendation, while at other times, the data that should be acquired can meet the data requirements of the elderly fall prevention application.

In other words, the server can provide different parts for different applications. For example, the server can split the output of the device, so that different applications can acquire different contents.

The specific configurations are illustrated in Table 8 below.

TABLE 8

| | Attribute information of the application | | | | Attribute information of device | | |
|---|---|---|---|---|---|---|---|
| Function description | Application output | Application input | Application input constraint condition | Device description | Device output | Device Configuration (set by server) |
| Application related to intelligent transportation | Configured to acquire the driver's head information during driving, and determine whether the driver is distracted and give a reminder. | Whether the driver's eyes are closed for a long time and whether the driver is looking ahead. | Driver image(s), Driver video(s) | Content = driver's head Time = during vehicle starts | Camera | Image(s), Video(s) | Vertical angle of device = (0, +90) Horizontal angle of device = (0, +90) Capturing condition = during vehicle starts |
| | Safety start of vehicle | Whether the driver is a legitimate user. | Driver image(s), Driver video(s) | Content = driver's head Time = when vehicle starts | Camera | Image(s), video(s) | Vertical angle of device = (0, +90) Horizontal angle of device = (0, −90) Capturing condition when vehicle starts |
| Application related to smart home | Configured to acquire the information of the elderly, and determine whether the elderly fell and give a reminder. | Whether the elderly suddenly fell. | Image(s) and video(s) of the elderly | Content = the elderly | Camera | Image(s), video(s) | Target recognition start Target = the elderly |
| | Clothing recommendation | Clothing collocation index | Image(s), video(s) | | Camera | Image(s), video(s) | User trigger start method = voice |

According to an embodiment of the present disclosure, configuring the device so that the device does not send the data that exceeds the data required by the application to the server includes: configuring the device at least according to the value range merging the value range of the application input attribute information and the value range of the application input constraint condition.

Accord to an embodiment of that present disclosure, configuring the device at least according to the value range merging the value range of the application input attribute information and the value range of the application input constraint condition includes: configuring the device according to the value range merging the value range of the application input attribute information and the value range of the application input constraint condition, or according to the value range merging the value range of the application input attribute information and the value range of the application input constraint condition, and the value range merging the value range of the device output attribute information and the value range of the device output constraint condition.

As an example, as illustrated in Table 1 above, it has been determined that the data output by the device exceeds the data required by the application according to the above-mentioned determination method. In this case, the device can be configured according to the value range (that is, content=driver's head image, driver's head video, content=during vehicle starts) merging the value range of the application input attribute information and the value range of the application input constraint condition, or according to the value range merging the value range of the application input attribute information and the value range of the application input constraint condition, and the value range (that is, content=image(s), video(s), time=fixed time interval) merging the value range of the device output attribute information and the value range of the device output constraint condition.

Specifically, the configuration information of the device can be generated according to the above-mentioned value range, and the mapping relationship between the above-mentioned value range and the configuration information of the device can be established and maintained by the server. Optionally, the server can try many times by the method of "configuration+verification" until the output content of the device meets the value range of the application input attribute information. The specific generation rules and the mapping relationship mentioned above can be flexibly set according to actual application scenarios.

According to an embodiment of the present disclosure, configuring the server so that the server does not receive data that exceeds the data required by the application includes: setting a response output constraint condition in the attribute information of the application; and responding to the data reporting request of the device according to the response output constraint condition, in which in the case where the response constraint condition is not met, the server does not respond to the data reporting request of the device, or the server returns a response comprising response failure in response to the data reporting request of the device.

As an example, the server first acquires the attribute information of the application, and the attribute information at least includes the application input constraint condition, then set the response output constraint condition based on the application input constraint condition, and finally, the server responds or does not respond to the request of the device according to the response output constraint condition.

Specifically, as illustrated in Table 9 below,

TABLE 9

| | Attribute information of the application | | | | Attribute information of device | |
| --- | --- | --- | --- | --- | --- | --- |
| Function description | Application output | Application input | Application input constraint condition | Response output constraint condition | Device output | Device description |
| Configured to acquire the driver's head information during driving, and determine whether the driver is distracted and give a reminder. | Whether the driver's eyes are closed for a long time and whether the driver is looking ahead. | Driver image(s), Driver video(s) | Location ≠ home State = driving | Location ≠ Home | Image(s), Video(s) | Camera |
| Configured to acquire the information of the elderly, and determine whether the elderly fell and give a reminder. | Whether the elderly suddenly fell. | Image(s) and video(s) of the elderly | Content = the elderly | Target = the elderly | Image(s), video(s) | Camera |

As illustrated in Table 9 above, for the first application, the server sets the response output constraint condition (that is, location=home) in the attribute information of the application according to the value range (that is, location ≠home, state=driving) of the application input constraint condition. Therefore, when the location of the device (camera) is at home and the device sends a data reporting request to the server at this time, that is, the response constraint condition set at this time is not met, the server may not respond to the data reporting request of the device, or the server may return a response including response failure in response to the data reporting request of the device, so that the server can refuse to receive the data of the device according to the response output constraint condition, and the risk of user privacy data being leaked is reduced.

As illustrated in Table 9 above, for the second application, the server sets the response output constraint condition (that is, target=the elderly) in the attribute information of the application according to the value range (that is, content=the elderly) of the application input constraint condition. Therefore, when the location of the device (camera) is at home and the device sends a data reporting request to the server at this time, that is, the response constraint condition set at this time is not met, the server may not respond to the data reporting request of the device, or the server returns a response including response failure in response to the data reporting request of the device, so that the server can refuse to receive the data of the device according to the response output constraint condition, and the risk of user privacy data being leaked is reduced.

According to an embodiment of the present disclosure, processing the received data so that the processed data does not exceed the data required by the application includes extracting data meeting the data required by the application from the received data.

Figure 3:
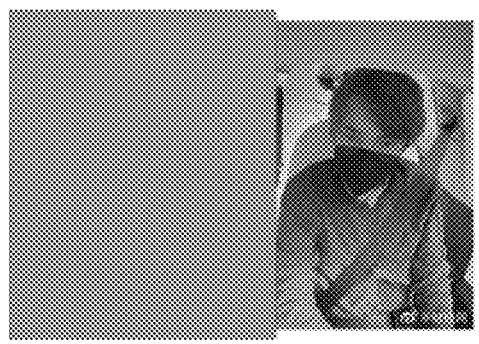
FIG. 3 illustrates a schematic diagram of extracting a region of interest according to at least an embodiment of the present disclosure.

As an example, in the case where multiple applications use the same device to acquire data and want to use different parts of the data, the configuration of the device cannot be adjusted, but the technology of region of interest (ROI) can be considered to achieve the segmentation and extraction of different objects (as illustrated in FIG. 3, the region of interest is extracted, and the uninterested region is covered with other colors such as gray), and the extracted data meeting the data required by the application can be provided to the corresponding application. In addition, the image(s) and video(s) can also be segmented, and then the segmented content can be provided to different applications. In addition, the server can encrypt the original data to ensure the safety of the original data, thus the risk of user privacy data being leaked is further reduced.

With reference to FIG. 1 to FIG. 3 and Table 1 to Table 9, the data processing method executed by the server provided by the present disclosure is described in detail above. It can be seen from the above description that the data processing method executed by the server provided by the present disclosure can effectively determine whether the data output by the device exceeds the data required by the application in various methods, and then the server or the device can be configured in various methods in the case where the data output by the device exceeds the data required by the application, such that the application only acquires data required by its own functions. This not only ensures the normal operation of the application functions, but also reduces the risk of user privacy data being leaked and improves the user experience.

Figure 4:
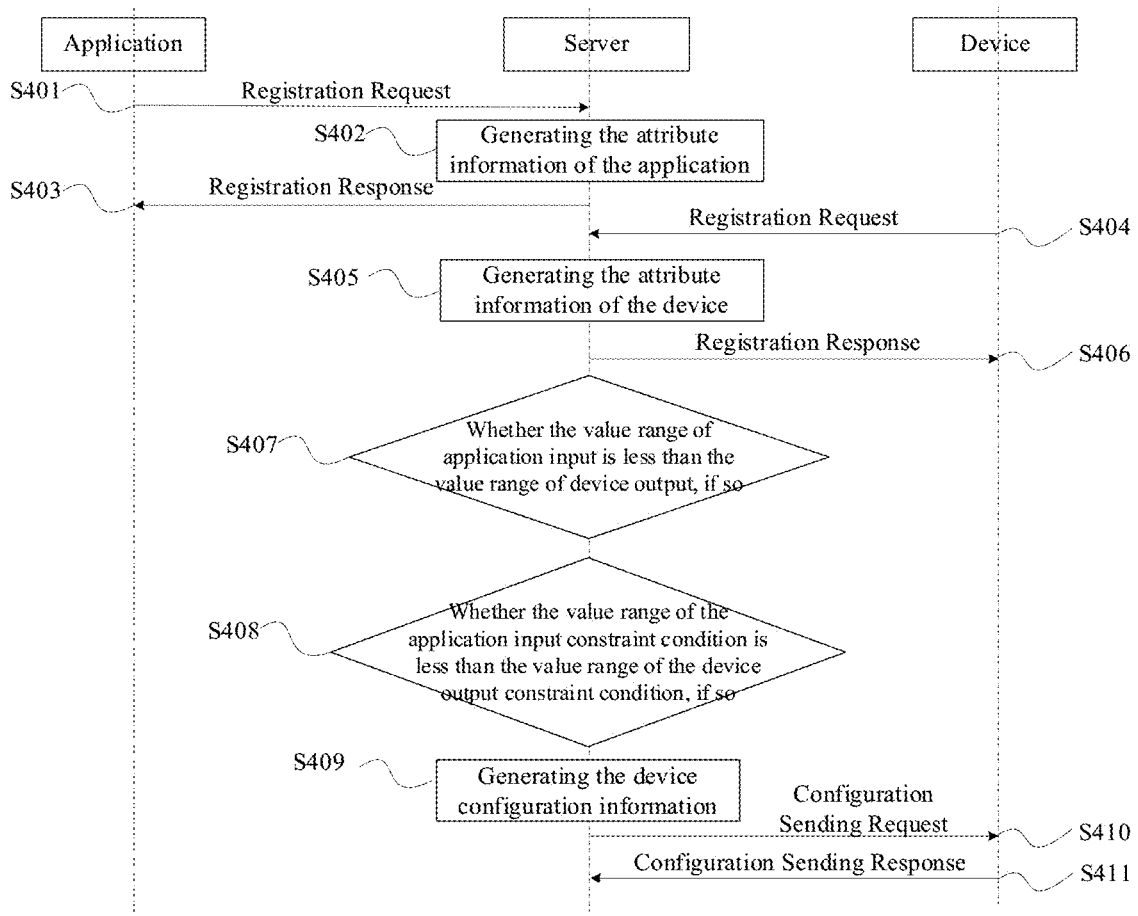
FIG. 4 illustrates an example of a data processing method executed by a server according to at least an embodiment of the present disclosure.
Figure 5:
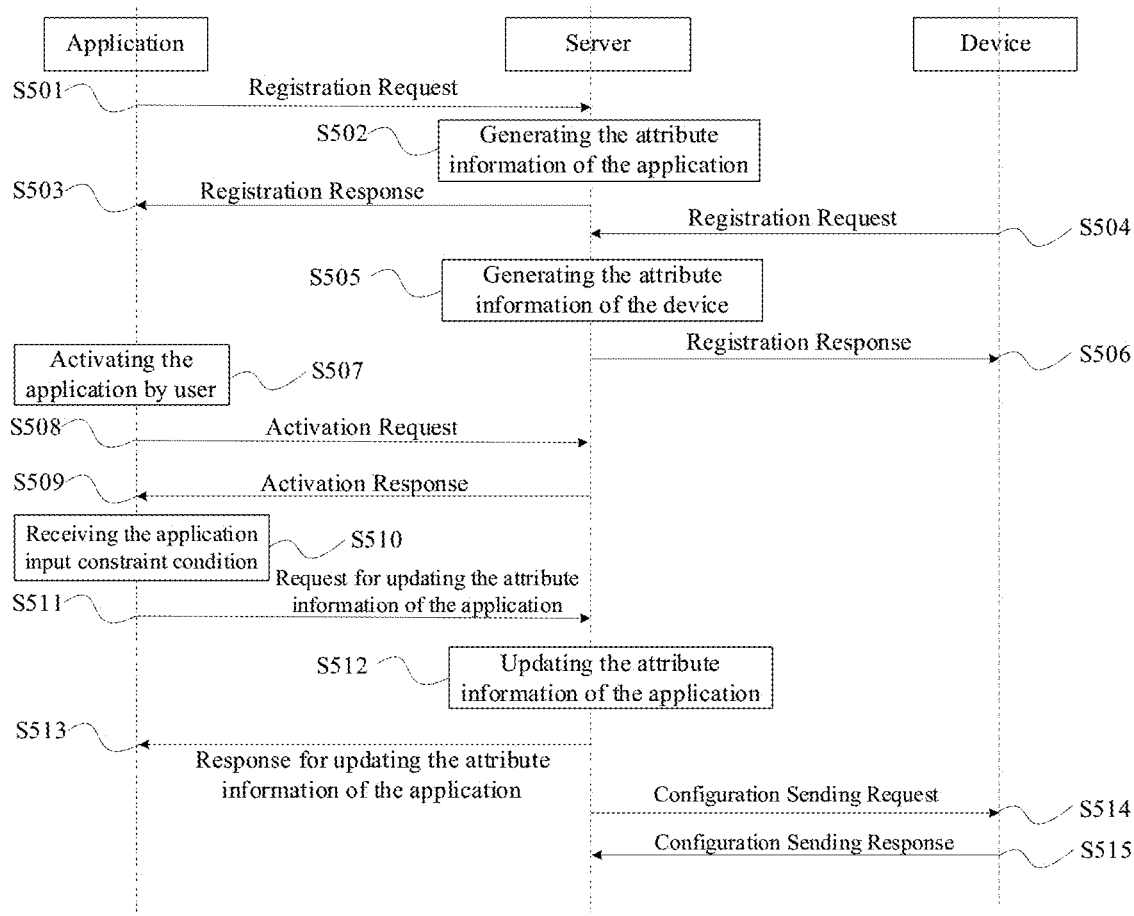
FIG. 5 illustrates another example of a data processing method executed by a server according to at least an embodiment of the present disclosure.
Figure 6:
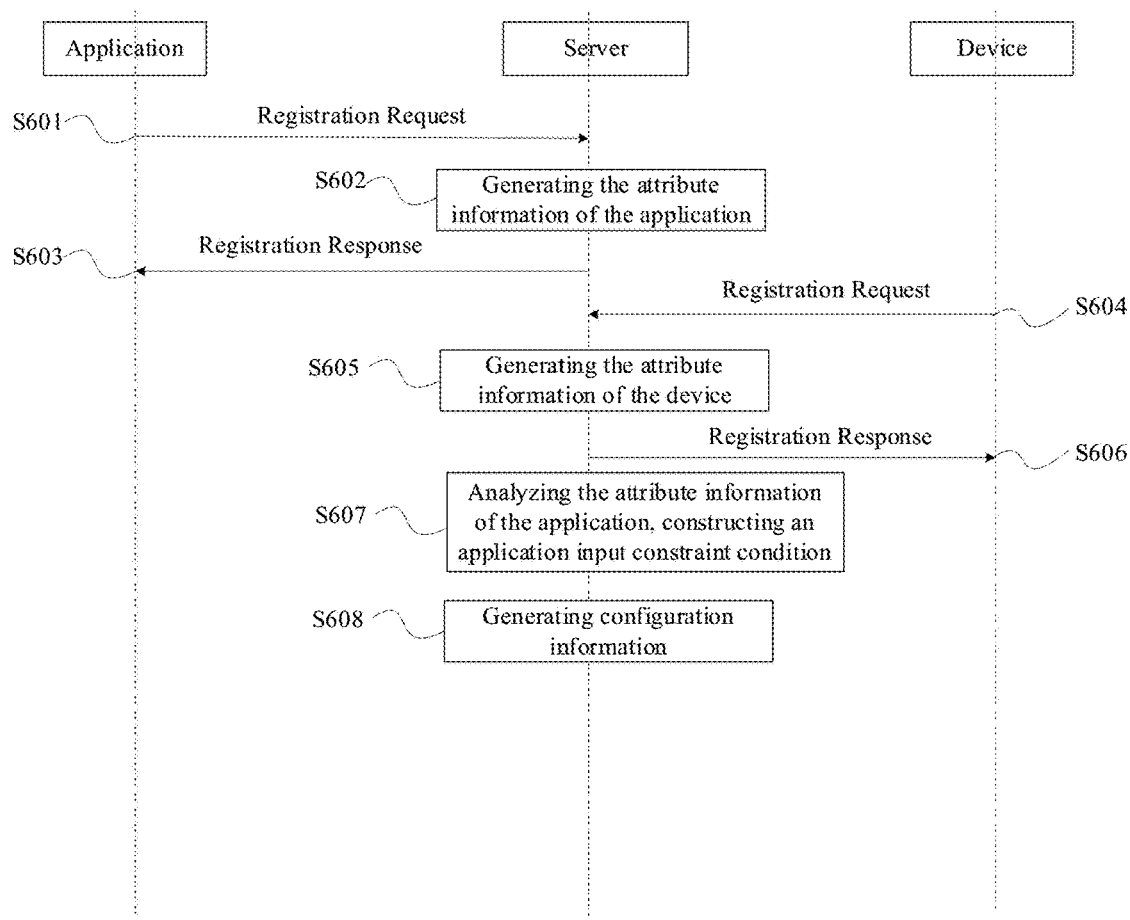
FIG. 6 illustrates yet another example of a data processing method executed by a server according to at least an embodiment of the present disclosure.

Next, with reference to FIG. 4 to FIG. 6, the above-mentioned data processing method executed by the server will be introduced in detail in the form of complete examples.

FIG. 4 illustrates an example of a data processing method executed by a server according to at least an embodiment of the present disclosure.

Referring to FIG. 4, in step S401, an application sends a registration request to a server, the registration request includes the relevant information of the application, such as function description, application input, application output, application input constraint condition, etc.

In step S402, the server generates the attribute information of the application according to the acquired relevant information of the application, the attribute information of the application includes a piece of function description attribute information, a piece of application input attribute information, a piece of application output attribute information, and an application input constraint condition, and the application input constraint condition includes time, place, environment and other elements when the application acquires the input. Optionally, the server can verify the value range of the attribute information of the application through a verification tool. For example, the verification tool can verify whether the content output by the application meets the requirements of the value range of the application output attribute information by providing the content within the value range of the application input required in the attribute information of the application to the application, and if meets, the attribute information is correct. Optionally, the verification tool can also provide the application with the content within the value range of the application input constraint condition to verify whether the content output by the application meets the requirements of the value range of the application output attribute information, and if meets, the attribute information is correct. Optionally, the verification tool can also provide input content to the application beyond the value range of the application input constraint condition to verify whether the output meets the requirements of the value range of application output attribute information, and if not, the attribute information is correct.

In step S403, the server sends a registration response to the application.

In step S404, the device sends a registration request to the server, and the registration request includes the relevant information of the device, such as function description, device output, device output constraint condition, etc.

In step S405, the server generates the attribute information of the device according to the acquired relevant information of the device, and the attribute information of the device includes a piece of device description attribute information, a piece of device output attribute information and a device output constraint condition.

In step S406, the server sends a registration response to the device.

With repeating steps S401 to S406, four applications (that is, two applications related to intelligent transportation and two applications related to smart home) are acquired as illustrated in Table 10 below.

TABLE 10

| | Attribute information of the application | | | | Attribute information of device | | |
|---|---|---|---|---|---|---|---|
| | Function description | Application output | Application input | Application input constraint condition | Device description | Device output | Device output constraint condition (set by server) |
| Application related to intelligent transportation | Configured to acquire the driver's head information during driving, and determine whether the driver is distracted and give a reminder. | Whether the driver's eyes are closed for a long time and whether the driver is looking ahead. | Driver image(s), Driver video(s) | Content = driver's head Time = during vehicle starts | Camera | Image(s), Video(s) | Interval sending during vehicle starts |
| | Safety start of vehicle | Whether the driver is a legitimate user. | Driver image(s), Driver video(s) | Content = driver's head Time = when vehicle starts | Camera | Image(s), Video(s) | Send when vehicle starts |

TABLE 10-continued

|  | Attribute information of the application | | | | Attribute information of device | | |
| --- | --- | --- | --- | --- | --- | --- | --- |
| | Function description | Application output | Application input | Application input constraint condition | Device description | Device output | Device output constraint condition (set by server) |
| Application related to smart home | Configured to acquire the information of the elderly, and determine whether the elderly fell and give a reminder. | Whether the elderly suddenly fell. | Image(s) and video(s) of the elderly | Content = the elderly | Camera | Image(s), video(s) | None |
| | Clothing recommendation | Clothing collocation index | Image(s), video(s) | | Camera | Image(s), video(s) | Triggered by user voice |

In step S407, for each application, it is determined whether the value range of application input is less than the value range of device output. After determination, the value range of application input for each application in the applications related to intelligent transportation is less than the value range of device output, that is, it can be determined that the data output by the device exceeds the data required by the application. For the applications related to smart home, the value range of the application input of the first application (that is, the application configured to acquire the information of the elderly, and determine whether the elderly fell and give a reminder) is less than the value range of the device output, that is, it can be determined that the data output by the device exceeds the data required by the application, while the value range of the application input of the second application (that is, the application of the clothing recommendation) is equal to the value range of the device output.

In order to make the determination result more accurate, in step S408, it is determined whether the value range of the application input constraint condition is less than the value range of the device output constraint condition for each application. After determination, the value range of the application input constraint condition for each application related to the intelligent transportation is less than the value range of the device output constraint condition, that is, it can be determined that the data output by device exceeds the data required by the application. For the applications related to smart home, the value range of the application input constraint condition of the first application (that is, the application configured to acquire the information of the elderly, and determine whether the elderly fell and give a reminder) is smaller than the value range of the device output constraint condition, that is, it can be determined that the data output by the device exceeds the data required by the application, while the value range of the application input constraint condition of the second application (that is, the application of the clothing recommendation) is greater than the value range of the device output constraint condition.

Through the above steps S407 and S408, it can be finally determined that the data output by the device exceeds the data required by the application. Therefore, the server or device needs to be configured. In this example, it is assumed that the device is configurable. Here, the configuration of the device is taken as an example to perform the following operations.

Specifically, for the applications related to intelligent transportation, it can be concluded that the value ranges of the application input attribute information of the two applications are the same, and the value range of the device output attribute information of the corresponding devices are the same. In this case, it is necessary to further compare the two application input constraint conditions and the device output constraint conditions, and it is found that the two application input constraint conditions do not overlap, so it is necessary to configure the device output constraint condition in a time-sharing manner, and the configurations are different at different times.

For the applications related to smart home, it can be concluded that the value ranges of the application input attribute information of the two applications are different, and the input constraint conditions of the two applications are also different. Therefore, the output constraint condition of the device can be configured, so that the device can acquire different data for different applications, such as adding a "triggered by user voice" configuration for the clothing recommendation application, so that the platform can know that the data that should be acquired at present can meet the data requirements of the clothing recommendation, while at other times, the data that should be acquired can meet the data requirements of the elderly fall prevention application.

Therefore, after the above processing, the server can get the device configuration illustrated in Table 11 below.

TABLE 11

| | Attribute information of the application | | | | Attribute information of the device | | |
|---|---|---|---|---|---|---|---|
| | Function description | Application output | Application input | Application input constraint condition | Device description | Device output | Device Configuration (set by server) |
| Application related to intelligent transportation | Configured to acquire the driver's head information during driving, and determine whether the driver is distracted and give a reminder. | Whether the driver's eyes are closed for a long time and whether the driver is looking ahead. | Driver image(s), Driver video(s) | Content = driver's head Time = during vehicle starts | Camera | Image(s), Video(s) | Vertical angle of device = (0, +90) Horizontal angle of device = (0, +90) Capturing condition = during vehicle starts |
| | Safety start of vehicle | Whether the driver is a legitimate user. | Driver image(s), Driver video(s) | Content = driver's head Time = when vehicle starts. | Camera | Image(s), video(s) | Vertical angle of device = (0, +90) Horizontal angle of device = (0, −90) Capturing condition = when vehicle starts. |
| Application related to smart home | Configured to acquire the information of the elderly, and determine whether the elderly fell and give a reminder. | Whether the elderly suddenly fell. | Image(s) and video(s) of the elderly | Content = the elderly | Camera | Image(s), video(s) | Target recognition start Target = the elderly |
| | Clothing recommendation | Clothing collocation index | Image(s), video(s) | | Camera | Image(s), video(s) | User trigger start method = voice |

In step S409, the server generates the device configuration information.

In step S410, the server sends a configuration sending request to the device and sends the generated configuration information to the device.

In step S411, the server receives a configuration sending response from the device, and then completes the configuration of the device, so that the data output by the device does not exceed the data required by the application, which not only meets the normal operation of the application, but also reduces the risk of user privacy data being leaked.

FIG. 5 illustrates another example of a data processing method executed by a server according to at least an embodiment of the present disclosure.

Referring to FIG. 5, the contents of steps S501 to S506 can refer to the contents of steps S401 to S406 of FIG. 4, and will not be repeated here.

In step S507, the user activates the application, for example, the user clicks the related application icon.

In step S508, the application sends an activation request to the server.

In step S509, the server sends an activation response to the application, indicating that the application is activated successful.

In step S510, the server illustrates the application configuration interface to the user, and the user inputs the application input constraint condition in the configuration interface, that is, the input constraint condition input by the user is received through the application.

In step S511, the application sends a request for updating the attribute information of the application to the server, and the request includes the application input constraint condition in the attribute information of the application that needs to be updated.

In step S512, the server updates the attribute information of the application after receiving the update request.

In step S513, the server sends a response for updating the attribute information of the application to the application, indicating that the update is successful.

After repeating the above-mentioned steps, the contents illustrated in Table 10 above can be acquired. Next, referring to the above-mentioned contents of steps S407 to S408 in FIG. 4, it can be determined that the data output by the device exceeds the data required by the application. Therefore, the server or device needs to be configured. In this example, it is assumed that the device is configurable. Here, the configuration of the device is taken as an example to perform the following operations. For the specific configuration method, please refer to the corresponding description of FIG. 4, and the content of device configuration as illustrated in Table 11 above is acquired. Then, the server generates the device configuration information accordingly, and in step S514, the server sends a configuration sending request to the device, thereby sending the configuration information to the device. Finally, in step S515, the server receives the configuration sending response from the device, and then completes the configuration of the device, so that the data output by the device does not exceed the data required by the application, which not only meets the normal operation of the application, but also reduces the risk of user privacy data being leaked.

FIG. 6 illustrates yet another example of a data processing method executed by a server according to at least an embodiment of the present disclosure.

Referring to FIG. 6, in step S601, an application sends a registration request to a server, and the registration request includes the relevant information of the application except the application input constraint condition, such as function description, application input, application output, etc.

In step S602, the server generates the attribute information of the application according to the acquired related information of the application, the attribute information of the application includes a piece of function description attribute information, a piece of application input attribute information and a piece of application output attribute information. Optionally, the server can verify the value range of the attribute information of the application through a verification tool. For example, the verification tool can verify whether the content output by the application meets the requirements of the value range of the application output attribute information by providing the content within the value range of the application input required in the attribute information of the application to the application, and if meets, the attribute information is correct.

In step S603, the server sends an application registration response to the application.

In step S604, the device sends a device registration request to the server, and the device registration request includes the relevant information of the device, such as function description, device output, device output constraint condition, etc.

In step S605, the server generates the attribute information of the device according to the acquired relevant information of the device, and the attribute information of the device includes a piece of device description attribute information, a piece of device output attribute information and a device output constraint condition.

In step S606, the server sends a registration response to the device.

In step S607, the server constructs an application input constraint condition by analyzing the attribute information of the application. Specifically, first, the server acquires the value range of the function description attribute information of the application. Second, the server extracts the keywords in the value range of the function description attribute information. Then, the extracted keywords are compared with the content in the value range of the application output attribute information and the content in the value range of the application input attribute information. Finally, the missing information content found after the comparison is added to the application input constraint condition.

As an example, the following table 12 is obtained by repeating the above-mentioned steps and the steps added after extraction and comparison.

TABLE 12

| | Attribute information of the application | | | Attribute information of the device | |
|---|---|---|---|---|---|
| Function description | Application output | Application input | Application input constraint condition | Device output | Device description |
| Configured to acquire the driver's head information during driving, and determine whether the driver is distracted and give a reminder. | Whether the driver's eyes are closed for a long time and whether the driver is looking ahead. | Driver image(s), Driver video(s) | Content = driver's head Time = during driving Location ≠ Home State = driving | Image(s), Video(s) | Camera |
| Configured to acquire the information of the elderly, and determine whether the elderly fell and give a reminder. | Whether the elderly suddenly fell. | Image(s) and video(s) of the elderly | Content = the elderly | Image(s), video(s) | Camera |

Through the above-mentioned determination method, it can be determined that the data output by the device exceeds the data required by the application, and the specific determination method will not be repeated here. Therefore, it is necessary to configure the server or device. Here, taking configuring the server as an example to perform the following operations.

In step S608, the server generates the configuration information.

Specifically, the server sets a response output constraint condition according to the value range of the application input constraint condition, and then the server can respond or not respond to the request of the device according to the response constraint condition.

As an example, the server sets the response output constraint condition as illustrated in Table 13 below.

TABLE 13

| | Attribute information of the application | | | | Attribute information of the device | |
|---|---|---|---|---|---|---|
| | | | Application input | Response output | | |
| Function description | Application output | Application input | constraint condition | constraint condition | Device output | Device description |
| Configured to acquire the driver's head information during driving, and determine whether the driver is distracted and give a reminder. | Whether the driver's eyes are closed for a long time and whether the driver is looking ahead. | Driver image(s), Driver video(s) | Content = driver's head Time = during driving Location ≠ Home State = driving | Location ≠ Home | Image(s), Video(s) | Camera |
| Configured to acquire the information of the elderly, and determine whether the elderly fell and give a reminder. | Whether the elderly suddenly fell. | Image(s) and video(s) of the elderly | Content = the elderly | Target = the elderly | Image(s), video(s) | Camera |

Specifically, as illustrated in Table 13 above, for the first application, the server sets the response output constraint condition (that is, location=home) in the attribute information of the application according to the value range (that is, location=home, state=driving) of the application input constraint condition of the first application. Therefore, when the location of the device (camera) is at home and the device sends a data reporting request to the server at this time, that is, the response constraint condition set at this time is not met, the server may not respond to the data reporting request of the device, or the server may return a response including response failure in response to the data reporting request of the device, so that the server can refuse to receive the data of the device according to the response output constraint condition, and the risk of user privacy data being leaked is reduced.

As illustrated in Table 13 above, for the second application, the server sets the response output constraint condition (that is, target=the elderly) in the attribute information of the application according to the value range (that is, content=the elderly) of the application input constraint condition of the second application. Therefore, when the location of the device (camera) is at home and the device sends a data reporting request to the server at this time, that is, the response constraint condition set at this time is not met, the server may not respond to the data reporting request of the device, or the server returns a response including response failure in response to the data reporting request of the device, so that the server can refuse to receive the data of the device according to the response output constraint condition, and the risk of user privacy data being leaked is reduced.

That is to say, in the case where multiple applications use the same device to acquire data and want to use different parts of the data, the configuration of the device cannot be adjusted at this time, but the technology of region of interest (ROI) can be considered to achieve the segmentation and extraction of different objects (as illustrated in FIG. 3 above, the region of interest is extracted, and the uninterested region is covered with other colors such as gray), and the extracted data meeting the data required by the application can be provided to the corresponding application. In addition, the image(s) and video(s) can also be segmented, and then the segmented content can be provided to different applications. In addition, the server can encrypt the original data to ensure the safety of the original data, thus the risk of user privacy data being leaked is further reduced.

The data processing method executed by the server provided by the present disclosure is described in detail in the form of three specific examples with reference to FIG. 4 to FIG. 6 and Table 10 to Table 13. It can be seen from the above description that the server can manually or automatically establish the constraint condition by determining whether the data uploaded by the device or the data actually uploaded exceeds the data required by the application. This not only ensures the normal operation of the application functions, but also reduces the risk of user privacy data being leaked and improves the user experience.

The present disclosure not only provides the above-mentioned data processing method executed by the server, but also provides a server. Next, the server provided by the present disclosure will be described with reference to FIG. 7.

Figure 7:
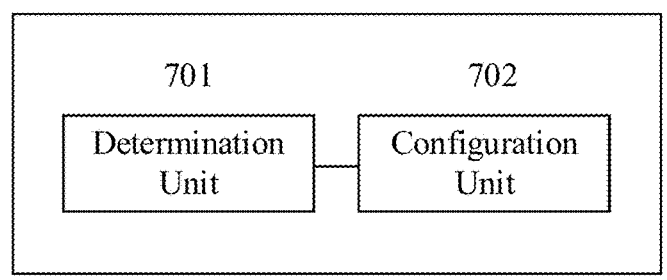
FIG. 7 illustrates a block diagram of a server 700 according to at least an embodiment of the present disclosure.

FIG. 7 illustrates a block diagram of a server 700 according to at least an embodiment of the present disclosure.

Referring to FIG. 7, the server 700 provided by the present disclosure includes a determination unit 701 and a configuration unit 702.

According to an embodiment of the present disclosure, the determination unit 701 is configured to determine whether the data output by the device exceeds the data required by the application.

As an example, the server is an Internet of Things platform, the device is an Internet of Things device capable of acquiring data, such as a camera, a speaker, etc., the application is an application related to smart home (such as an application for intelligently controlling home devices through voice recognition, an application for acquiring information of the elderly to determine whether the elderly fell and reminding the elderly, etc.), and the data output by the device includes at least one selected from a group consisting of: audio data, image data and video data, but not limited to this.

As another example, the server is an Internet of Vehicles platform, the device is a data acquisition device of a vehicle, the application is an application related to intelligent transportation installed in the vehicle (for example, a vehicle safety driving application, a network car-hailing application, etc., and the vehicle safety driving application or the network car-hailing application can determine whether the driver has behavior such as fatigue driving through image(s) and/or video(s) of the driver), and the data output by the device includes data related to the vehicle and/or environmental information around the vehicle. For example, the data acquisition device includes an image acquisition device, and the data related to the vehicle includes image(s) and/or video(s) of the interior of the vehicle shot by the image acquisition device. In addition, as an example, the data required by the application includes image(s) and/or video(s) of the driver of the vehicle, but not limited thereto.

Accord to an embodiment of that present disclosure, the device and application can be registered to the server.

According to an embodiment of the present disclosure, the server further include an acquisition unit.

As an example, the acquisition unit is configured to acquire the attribute information of the application, in which the attribute information of the application includes a piece of application input attribute information and/or an application input constraint condition; and acquire the attribute information of the device, in which the attribute information of the device includes a piece of device output attribute information and/or a device output constraint condition.

According to an embodiment of the present disclosure, the attribute information of the application or the attribute information of the device can be acquired in the following ways.

First, the server can define attribute information for the application or the device. Specifically, the application will provide the attribute information of the application to the server when the application is released, and the server can define the attribute information for the application according to the provided attribute information, or the server can generate the attribute information of the application according to the relevant information of the application. Similarly, the device will provide the attribute information of the device when the device registers with the server, or the server can acquire the attribute information of the device through an out-of-band mechanism; and the server can define the attribute information for the device according to the attribute information, or the server can generate the attribute information of the device according to the related information of the device, for example, the server can acquire the reporting information of the device, and then construct the attribute information of the device according to the reporting information of the device.

Second, the server can acquire the attribute information of the application. The attribute information of the application includes at least one selected from a group consisting of: the function description attribute information, the application input attribute information, the application output attribute information, and the application input constraint condition, and the application input constraint condition includes time, place, environment and other elements when the application acquires the input. Optionally, the server can verify the value range of the attribute information of the application through a verification tool. For example, the verification tool can verify whether the content output by the application meets the requirements of the value range of the application output attribute information by providing the content within the value range of the application input required in the attribute information of the application to the application, and if meets, the attribute information is correct. Optionally, the verification tool can also provide the content within the value range of the application input constraint condition to the application to verify whether the content output by the application meets the requirements of the value range of the application output attribute information, and if meets, the attribute information is correct. Optionally, the verification tool can also provide input content to the application beyond the value range of the application input constraint condition to verify whether the output meets the requirements of the value range of the application output attribute information, and if not meets, the attribute information is correct.

Finally, the server can acquire the attribute information of the device. The attribute information of the device may include at least one selected from a group consisting of: the device description attribute information, the device output attribute information and the device output constraint condition.

In addition, the above-mentioned order in which the server acquires the attribute information of the device and the attribute information of the application is only an example, and the server may acquire the attribute information of the device first and then the attribute information of the application, or the server may acquire the attribute information of the device and the attribute information of the application at the same time.

According to an embodiment of the present disclosure, the attribute information of the application or the attribute information of the device can also be acquired by user input.

According to an embodiment of the present disclosure, the attribute information of the application can also be acquired in the following way, which is more suitable for the case that the server has acquired the function description attribute information, the application input attribute information and the application output attribute information of the application and their value ranges, but lacks the value range of the application input constraint condition:

First, the server acquires the value range of the function description attribute information of the application.

Second, the server uses technologies such as natural language processing, machine learning, etc. to the extract keyword(s) in the value range of the function description attribute information.

Then, the extracted keywords are compared with the contents in the value range of the application output attribute information and the contents in the value range of the application input attribute information.

Finally, if the information is found to be missing after comparison, the missing content is added to the application input constraint condition.

According to an embodiment of the present disclosure, determining whether the data output by the device exceeds the data required by the application includes determining whether the data output by the device exceeds the data required by the application according to the acquired attribute information of the application and the acquired attribute information of the device.

According to an embodiment of the present disclosure, it can be determined whether the data output by the device exceeds the data required by the application by determining whether the value range of the application input attribute information is less than the value range of the device output attribute information.

According to an embodiment of the present disclosure, it can be determined whether the data output by the device exceeds the data required by the application by determining whether the value range of the application input constraint condition is less than the value range of the device output constraint condition.

According to an embodiment of the present disclosure, it can be determined whether the data output by the device exceeds the data required by the application by determining whether the value range of the application input attribute information and the value range of the application input constraint condition is less than the value range of the device output attribute information and the value range of the device output constraint condition.

In addition, for the case that multiple applications correspond to the same device, the determination can be made separately for each application, as long as the result of determining one application is that the data output by the device exceeds the data required by the application, it can finally conclude that the data output by the device exceeds the data required by the application. The specific method of determining whether the data output by the device exceeds the data required by the application can refer to the above-mentioned description and will not be repeated here.

According to an embodiment of the present disclosure, the configuration unit 702 is configured to configure the server or the device in the case where the data output by the device exceeds the data required by the application.

According to an embodiment of the present disclosure, configuring the server or the device includes: if the device is configurable, configuring the device so that the device does not send data that exceeds the data required by the application to the server, or configuring the server so that the server does not receive data that exceeds the data required by the application, or processing received data so that processed data does not exceed the data required by the application in the case where the server receives data that exceeds the data required by the application.

According to an embodiment of the present disclosure, configuring the server or the device further includes: if the device is not configurable, configuring the server so that the server does not receive data that exceeds the data required by the application, or processing received data so that processed data does not exceed the data required by the application in the case where the server receives data that exceeds the data required by the application.

According to an embodiment of the present disclosure, configuring the device so that the device does not send the data that exceeds the data required by the application to the server includes configuring the device at least according to the value range of the application input attribute information.

According to an embodiment of the present disclosure, configuring the device at least according to the value range of the application input attribute information includes: configuring the device according to the value range of the application input attribute information, or according to the value range of the application input attribute information and the value range of the device output attribute information.

As an example, as illustrated in Table 1 above, it has been determined that the data output by the device exceeds the data required by the application according to the above-mentioned determination method. In this case, the device can be configured according to the value range of the application input attribute information (driver image(s), driver video(s), etc.), or according to the value range of the application input attribute information and the value range of the device output attribute information (image(s), video(s), etc.). For example, in the case where the device is a data acquisition device of a vehicle and the data acquisition device includes an image acquisition device, configuring the device includes, but is not limited to, adjusting the shooting angle and/or the shooting trigger condition of the image acquisition device.

Specifically, the configuration information of the device can be generated according to the above-mentioned value range, and the mapping relationship between the above-mentioned value range and the configuration information of the device can be established and maintained by the server. Optionally, the server can try many times by the method of "configuration+verification" until the output content of the device meets the value range of the application input attribute information. The specific generation rule and the mapping relationship mentioned above can be flexibly set according to actual application scenarios.

According to an embodiment of the present disclosure, configuring the device so that the device does not send the data that exceeds the data required by the application to the server includes configuring the device at least according to the value range of the application input constraint condition.

According to an embodiment of the present disclosure, configuring the device at least according to the value range of the application input constraint condition includes: configuring the device according to the value range of the application input constraint condition, or according to the value range of the application input constraint condition and the value range of the device output constraint condition.

As an example, in the case where a single application or multiple applications have the same or similar data requirement (that is, the value range(s) of the application input attribute information of a single application or multiple applications is(are) the same or similar), the server can generate the device output constraint condition, and then configure the device.

Specifically, the server can change the configuration of the device so that the data of the device meets the generated device output constraint condition. In the case where the data provided by the device is greater than the data required by the application, the configuration of the device is modified to reduce the output data range of the device and meet the data required by the application.

Specifically, the configuration information of the device can be based on the value range of the application input constraint condition and/or the value range of the device output constraint condition.

According to an embodiment of the present disclosure, configuring the device so that the device does not send the data that exceeds the data required by the application to the server includes: configuring the device at least according to the value range merging the value range of the application input attribute information and the value range of the application input constraint condition.

Accord to an embodiment of that present disclosure, configuring the device at least according to the value range merging the value range of the application input attribute information and the value range of the application input constraint condition includes: configuring the device according to the value range merging the value range of the application input attribute information and the value range of the application input constraint condition, or according to the value range merging the value range of the application input attribute information and the value range of the application input constraint condition, and the value range merging the value range of the device output attribute information and the value range of the device output constraint condition.

As an example, as illustrated in Table 1 above, it has been determined that the data output by the device exceeds the data required by the application according to the above-mentioned determination method. In this case, the device can be configured according to the value range (that is, content=driver's head image, driver's head video, content=during vehicle starts) merging the value range of the application input attribute information and the value range of the application input constraint condition, or according to the value range merging the value range of the application input attribute information and the value range of the application input constraint condition, and the value range (that is, content=image(s), video(s), time=fixed time interval) merging the value range of the device output attribute information and the value range of the device output constraint condition.

Specifically, the configuration information of the device can be generated according to the above-mentioned value range, and the mapping relationship between the above-mentioned value range and the configuration information of the device can be established and maintained by the server. Optionally, the server can try many times by the method of "configuration+verification" until the output content of the device meets the value range of the application input attribute information. The specific generation rules and the mapping relationship mentioned above can be flexibly set according to actual application scenarios.

According to an embodiment of the present disclosure, configuring the server so that the server does not receive data that exceeds the data required by the application includes: setting a response output constraint condition in the attribute information of the application; and responding to the data reporting request of the device according to the response output constraint condition, in which in the case where the response constraint condition is not met, the server does not respond to the data reporting request of the device, or the server returns a response comprising response failure in response to the data reporting request of the device.

As an example, the server first acquires the attribute information of the application, and the attribute information at least includes the application input constraint condition, then set the response output constraint condition based on the application input constraint condition, and finally, the server responds or does not respond to the request of the device according to the response output constraint condition.

According to an embodiment of the present disclosure, processing the received data so that the processed data does not exceed the data required by the application includes extracting data meeting the data required by the application from the received data.

As an example, in the case where multiple applications use the same device to acquire data and want to use different parts of the data, the configuration of the device cannot be adjusted, but the technology of region of interest (ROI) can be considered to achieve the segmentation and extraction of different objects (as illustrated in FIG. 3, the region of interest is extracted, and the uninterested region is covered with other colors such as gray), and the extracted data meeting the data required by the application can be provided to the corresponding application. In addition, the image(s) and video(s) can also be segmented, and then the segmented content can be provided to different applications. In addition, the server can encrypt the original data to ensure the safety of the original data, thus the risk of user privacy data being leaked is further reduced.

Because the detail of the content involved in the above operations have been introduced in the process of describing the data processing method executed by the server according to the present disclosure, they are not repeated here for the sake of brevity, and the relevant detail can refer to the above descriptions of FIG. 1 to FIG. 6 and Table 1 to Table 13.

The data processing method executed by the server and the server according to the disclosed embodiments have been described above with reference to FIG. 1 to FIG. 7 and Table 1 to Table 13. However, it can be understood that each unit in the server illustrated in FIG. 7 can be configured as a software, a hardware, a firmware or any combination of the above items to perform specific functions, respectively. For example, these units can correspond to special integrated circuits, pure software codes, and modules combining a software and a hardware.

In addition, the present disclosure further provides another server, which will be described with reference to FIG. 8.

Figure 8:
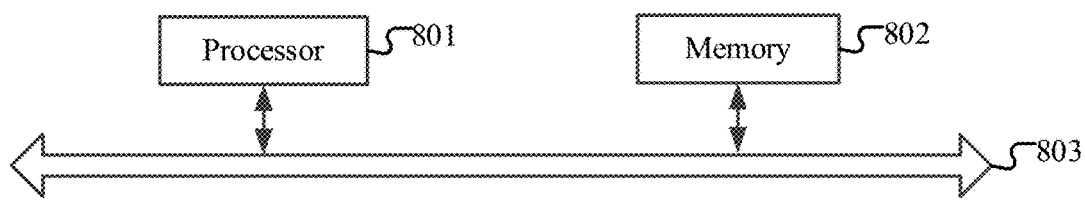
FIG. 8 illustrates a structural diagram of a server 800 according to at least an embodiment of the present disclosure.

FIG. 8 illustrates a structural diagram of a server 800 according to at least an embodiment of the present disclosure.

Referring to FIG. 8, the server 800 includes a processor 801 and a memory 802. The processor 801 and the memory 802 can be connected by a bus 803. The server 800 may be a tower server, a Rack server, a Blade Server, a cabinet server, or the like.

The processor 801 can perform various operations and processes according to the program stored in the memory 802. Specifically, the processor 801 is an integrated circuit chip with signal processing capability. The processor may be a general processor, a digital signal processor (DSP), an application specific integrated circuit (ASIC), a field-programmable gate array (FPGA) or other programmable logic device, a discrete gate or a transistor logic device, and a discrete hardware component. The methods, steps and logic blocks disclosed in the embodiments of the present application can be realized or executed by the processor. The general processor may be a microprocessor or any conventional processor, and the general processor may be X86 architecture, ARM architecture, or the like.

The memory 802 stores computer-executable instructions, which, when executed by the processor 801, realize the above-mentioned data processing method executed by the processor. The memory 802 may be a volatile memory or a nonvolatile memory, or may include both volatile and nonvolatile memories. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which is used as an external cache. With the way of illustration but not limitation, many forms of RAM are available, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous connection dynamic random access memory (SLDRAM) and a direct memory bus random access memory (DR RAM). It can be noted that the memories described herein are intended to include, but are not limited to, these and any other suitable types of memories.

In the present technical solutions, the device, the application and the server can be three independent devices, or the specific content related to the application can be integrated/stored in the server, and the server can directly process the data according to the requirement of the specific application.

Furthermore, the data processing method executed by a server according to the present disclosure can be recorded in a computer-readable recording medium. Specifically, according to the present disclosure, a computer-readable recording medium can be provided, in which computer-executable instructions are stored, which, when executed by a processor, can cause the processor to perform the data processing method performed by a server as described above.

It can be noted that the flowcharts and block diagrams in the drawings illustrate the possible architectures, functions and operations of systems, methods and computer program products according to various embodiments of the present disclosure. In this regard, each block in the flowchart or block diagram may represent a module, a program segment, or a part of code, which contains at least one executable instruction for implementing a specified logical function. It can also be noted that in some alternative implementations, the functions noted in the blocks may occur in a different order than those noted in the drawing. For example, two blocks illustrated in succession may actually be executed substantially in parallel, and they may sometimes be executed in the reverse order, which depends on the function involved. It can also be noted that each block in the block diagram and/or the flowchart, and the combination of blocks in the block diagram and/or the flowchart, can be implemented by a dedicated hardware-based system that perform specified function or operation, or by the combination of a dedicated hardware and a computer instruction.

In general, various example embodiments of the present disclosure may be implemented in a hardware or a dedicated circuit, a software, a firmware, a logic, or any combination thereof. Some aspects may be implemented in the hardware, while other aspects may be implemented in the firmware or the software that may be executed by a controller, a microprocessor or other computing device. When aspects of the embodiments of the present disclosure are illustrated or described as a block diagram, a flowchart, or are represented by other graphs, it can be understood that the block, the device, the system, the technology, or the method described herein may be implemented in a hardware, a software, a firmware, a special-purpose circuit or a logic, a general-purpose hardware or a controller or other computing device, or some combination thereof, as a non-limiting example.

The exemplary embodiments of the present disclosure described in detail above are only illustrative, not restrictive. It can be understood by those skilled in the art that various modifications and combinations can be made to these embodiments or their features without departing from the principle and spirit of this disclosure, and such modifications can fall within the scope of this disclosure.

What is claimed is:

1. A data processing method executed by a server, comprising:
    determining whether data output by a device exceeds data required by an application, wherein the device and the application are registered to the server; and
    configuring the server or the device in a case where the data output by the device exceeds the data required by the application,
    wherein configuring the server or the device comprises:
    if the device being configurable, configuring the device so that the device does not send data that exceeds the data required by the application to the server, or configuring the server so that the server does not receive data that exceeds the data required by the application, or processing received data so that processed data does not exceed the data required by the application in a case where the server receives data that exceeds the data required by the application; and
    if the device being not configurable, configuring the server so that the server does not receive data that exceeds the data required by the application, or processing received data so that processed data does not exceed the data required by the application in a case where the server receives data that exceeds the data required by the application,
    before determining whether the data output by the device exceeds the data required by the application, further comprising:
    acquiring a piece of attribute information of the application, wherein the attribute information of the application comprises a piece of application input attribute information and/or an application input constraint condition; and
    acquiring a piece of attribute information of the device, wherein the attribute information of the device comprises a piece of device output attribute information and/or a device output constraint condition,
    wherein determining whether the data output by the device exceeds the data required by the application comprises:
    determining whether the data output by the device exceeds the data required by the application according to the attribute information of the application and the attribute information of the device.

2. The method according to claim 1, wherein determining whether the data output by the device exceeds the data required by the application according to the attribute information of the application and the attribute information of the device comprises:
    determining whether the data output by the device exceeds the data required by the application according to at least one selected from a group consisting of:
    whether a value range of the application input attribute information is less than a value range of the device output attribute information;
    whether a value range of the application input constraint condition is less than a value range of the device output constraint condition; and
    whether a value range merging the value range of the application input attribute information and the value range of the application input constraint condition is less than a value range merging the value range of the device output attribute information and the value range of the device output constraint condition.

3. The method according to claim 1, wherein configuring the device so that the device does not send the data that exceeds the data required by the application to the server comprises configuring the device by at least one selected from a group consisting of:
  configuring the device at least according to a value range of the application input attribute information;
  configuring the device at least according to a value range of the application input constraint condition; and
  configuring the device at least according to a value range merging the value range of the application input attribute information and the value range of the application input constraint condition.

4. The method according to claim 3,
wherein configuring the device at least according to the value range of the application input attribute information comprises: configuring the device according to the value range of the application input attribute information, or according to the value range of the application input attribute information and a value range of the device output attribute information;
configuring the device at least according to the value range of the application input constraint condition comprises: configuring the device according to the value range of the application input constraint condition, or according to the value range of the application input constraint condition and a value range of the device output constraint condition; and
configuring the device at least according to the value range merging the value range of the application input attribute information and the value range of the application input constraint condition comprises: configuring the device according to the value range merging the value range of the application input attribute information and the value range of the application input constraint condition, or according to the value range merging the value range of the application input attribute information and the value range of the application input constraint condition and a value range merging the value range of the device output attribute information and the value range of the device output constraint condition.

5. The method according to claim 1, wherein configuring the server so that the server does not receive the data that exceeds the data required by the application comprises:
  setting a response output constraint condition in the attribute information of the application; and
  responding to a data reporting request of the device according to the response output constraint condition, wherein in a case where the response constraint condition is not met, the server does not respond to the data reporting request of the device, or the server returns a response comprising response failure in response to the data reporting request of the device;
  and setting the response output constraint condition in the attribute information of the application comprises:
  setting the response output constraint condition according to the application input constraint condition.

6. The method according to claim 1, wherein processing the received data so that the processed data does not exceed the data required by the application comprises:
  extracting data meeting the data required by the application from the received data.

7. The method according to claim 1, wherein the server is an Internet of Vehicles platform, the device is a data acquisition device of a vehicle, the application is an application related to intelligent transportation installed in the vehicle, and the data output by the device comprises data related to the vehicle and/or a piece of environmental information around the vehicle;
  the data acquisition device comprises an image acquisition device, the data related to the vehicle comprises an image and/or a video of an interior of the vehicle shot by the image acquisition device, and the data required by the application comprises an image and/or a video of a driver of the vehicle; and
  configuring the device comprises adjusting a shooting angle and/or a shooting trigger condition of the image acquisition device.

8. The method according to claim 1, wherein the server is an Internet of Things platform, the device is an Internet of Things device capable of acquiring data, the application is an application related to smart home, and the data output by the device comprises at least one selected from a group consisting of: audio data, image data and video data.

9. A server, comprising:
  a determination unit, configured to determine whether data output by a device exceeds data required by an application, wherein the device and the application are registered to the server; and
  a configuration unit, configured to configure the server or the device in a case where that the data output by the device exceeds the data required by the application,
  wherein configuring the server or the device comprises:
  if the device being configurable, configuring the device so that the device does not send data that exceeds the data required by the application to the server, or configuring the server so that the server does not receive data that exceeds the data required by the application, or processing received data so that processed data does not exceed the data required by the application in a case where the server receives data that exceeds the data required by the application; and
  if the device being not configurable, configuring the server so that the server does not receive data that exceeds the data required by the application, or processing received data so that processed data does not exceed the data required by the application in a case where the server receives data that exceeds the data required by the application,
  wherein the server further comprises an acquisition unit configured to:
  acquire a piece of attribute information of the application, wherein the attribute information of the application comprises a piece of application input attribute information and/or an application input constraint condition; and
  acquire a piece of attribute information of the device, wherein the attribute information of the device comprises a piece of device output attribute information and/or a device output constraint condition,
  wherein determining whether the data output by the device exceeds the data required by the application comprises:
  determining whether the data output by the device exceeds the data required by the application according to the attribute information of the application and the attribute information of the device.

10. The server according to claim 9, wherein determining whether the data output by the device exceeds the data required by the application according to the attribute information of the application and the attribute information of the device comprises:

determining whether the data output by the device exceeds the data required by the application according to at least one selected from a group consisting of:
whether a value range of the application input attribute information is less than a value range of the device output attribute information;
whether a value range of the application input constraint condition is less than a value range of the device output constraint condition; and
whether a value range merging the value range of the application input attribute information and the value range of the application input constraint condition is less than a value range merging the value range of the device output attribute information and the value range of the device output constraint condition.

11. The server according to claim 9, wherein configuring the device so that the device does not send the data that exceeds the data required by the application to the server comprises configuring the device by at least one selected from a group consisting of:
configuring the device at least according to a value range of the application input attribute information;
configuring the device at least according to a value range of the application input constraint condition; and
configuring the device at least according to a value range merging the value range of the application input attribute information and the value range of the application input constraint condition.

12. The server according to claim 11,
wherein configuring the device at least according to the value range of the application input attribute information comprises: configuring the device according to the value range of the application input attribute information, or according to the value range of the application input attribute information and a value range of the device output attribute information;
configuring the device at least according to the value range of the application input constraint condition comprises: configuring the device according to the value range of the application input constraint condition, or according to the value range of the application input constraint condition and a value range of the device output constraint condition; and
configuring the device at least according to the value range merging the value range of the application input attribute information and the value range of the application input constraint condition comprises: configuring the device according to the value range merging the value range of the application input attribute information and the value range of the application input constraint condition, or according to the value range merging the value range of the application input attribute information and the value range of the application input constraint condition and a value range merging the value range of the device output attribute information and the value range of the device output constraint condition.

13. The server according to claim 9, wherein configuring the server so that the server does not receive the data that exceeds the data required by the application comprises:
setting a response output constraint condition in the attribute information of the application; and
responding to a data reporting request of the device according to the response output constraint condition, wherein in a case where the response constraint condition is not met, the server does not respond to the data reporting request of the device, or the server returns a response comprising response failure in response to the data reporting request of the device;
and setting the response output constraint condition in the attribute information of the application comprises:
setting the response output constraint condition according to the application input constraint condition.

14. The server according to claim 9, wherein processing the received data so that the processed data does not exceed the data required by the application comprises:
extracting data meeting the data required by the application from the received data.

15. The server according to claim 9, wherein the server is an Internet of Vehicles platform, the device is a data acquisition device of a vehicle, the application is an application related to intelligent transportation installed in the vehicle, and the data output by the device comprises data related to the vehicle and/or a piece of environmental information around the vehicle;
the data acquisition device comprises an image acquisition device, the data related to the vehicle comprises an image and/or a video of an interior of the vehicle shot by the image acquisition device, and the data required by the application comprises an image and/or a video of a driver of the vehicle; and
configuring the device comprises adjusting a shooting angle and/or a shooting trigger condition of the image acquisition device.

16. The server according to claim 9, wherein the server is an Internet of Things platform, the device is an Internet of Things device capable of acquiring data, the application is an application related to smart home, and the data output by the device comprises at least one selected from a group consisting of: audio data, image data and video data.

* * * * *